(12) United States Patent
Douglas et al.

(10) Patent No.: US 11,687,607 B2
(45) Date of Patent: Jun. 27, 2023

(54) SYSTEM AND METHOD FOR FACILITATING PRESENTATION MODIFICATION OF A USER INTERFACE

(71) Applicant: Capital One Services, LLC, McLean, VA (US)

(72) Inventors: Lawrence Douglas, McLean, VA (US); Jeffrey Rule, Chevy Chase, MD (US); Kaitlin Newman, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/667,267

(22) Filed: Feb. 8, 2022

(65) Prior Publication Data
US 2022/0215062 A1    Jul. 7, 2022

Related U.S. Application Data

(63) Continuation of application No. 17/091,827, filed on Nov. 6, 2020, now Pat. No. 11,341,200.

(51) Int. Cl.
*G06F 16/95*    (2019.01)
*G06F 16/9535*    (2019.01)
*G06F 9/451*    (2018.01)
*G06F 16/958*    (2019.01)
*G06F 21/34*    (2013.01)
*G06F 21/44*    (2013.01)

(52) U.S. Cl.
CPC .......... *G06F 16/9535* (2019.01); *G06F 9/451* (2018.02); *G06F 16/958* (2019.01); *G06F 21/34* (2013.01); *G06F 21/44* (2013.01)

(58) Field of Classification Search
CPC ..... G06F 16/9535; G06F 16/958; G06F 9/451
See application file for complete search history.

(56) References Cited

U.S. PATENT DOCUMENTS

| | | |
|---|---|---|
| 10,108,733 B2 | 10/2018 | Jacob et al. |
| 10,310,699 B1 | 6/2019 | Jain et al. |
| 10,423,612 B2 | 9/2019 | Liensberger et al. |

(Continued)

OTHER PUBLICATIONS

International Search Report and Written Opinion issued in related International Application No. PCT/US2021/057826 dated Feb. 21, 2022 (10 pages).

*Primary Examiner* — Eliyah S. Harper
(74) *Attorney, Agent, or Firm* — Perkins Coie LLP

(57) ABSTRACT

In certain embodiments, a presentation of a user interface may be dynamically modified for a user based on data related to the user's email address or other user identifier. As an example, the user interface may be caused to reflect the look and feel of an interface of an entity trusted by the user, incorporate data items related to the user's identifier, or effectuate other modifications. In some embodiments, a user identifier of a user may be received via a user interface associated with the third party, and a query for data related to one or more user accounts associated with the user identifier may be generated. Based on the query, multiple datasets associated with different user accounts may be received, and a first dataset associated with a first account of the user may be selected over other datasets associated with the user's other accounts effectuate the presentation modification.

20 Claims, 3 Drawing Sheets

(56) References Cited

U.S. PATENT DOCUMENTS

| | | | |
|---|---|---|---|
| 10,474,329 B2 | 11/2019 | Yamashita | |
| 2002/0165774 A1 | 11/2002 | Quinn et al. | |
| 2004/0093281 A1* | 5/2004 | Silverstein | G06Q 20/24 |
| | | | 705/26.8 |
| 2008/0178073 A1* | 7/2008 | Gao | G06F 40/103 |
| | | | 715/243 |
| 2017/0228460 A1* | 8/2017 | Amel | G06F 16/2462 |
| 2018/0218729 A1* | 8/2018 | Saini | G10L 15/18 |
| 2020/0034160 A1* | 1/2020 | Koren | H04L 41/0253 |
| 2020/0272764 A1* | 8/2020 | Brannon | G06F 21/6218 |
| 2020/0296082 A1* | 9/2020 | Killoran, Jr. | G06Q 20/385 |
| 2021/0037353 A1* | 2/2021 | Locascio | H04W 4/10 |
| 2021/0374479 A1* | 12/2021 | Zambetti, Jr. | G06F 16/3344 |

\* cited by examiner

SYSTEM AND METHOD FOR FACILITATING PRESENTATION MODIFICATION OF A USER INTERFACE

CROSS-REFERENCE TO RELATED APPLICATIONS

This application is a continuation of U.S. patent application Ser. No. 17/091,827, filed Nov. 6, 2020. The content of the foregoing application is incorporated herein in its entirety by reference.

FIELD OF THE INVENTION

The invention relates to modification of a presentation of user interface, including, for example, a system that enables a presentation of a third-party website to be dynamically modified for a user based on data related to the user's email address or other user identifier by causing the third-party website to reflect the look and feel of a website of an entity trusted by the user or to incorporate one or more data items related to the user's identifier.

BACKGROUND

When users access a website unfamiliar to the users (or lacking the same indicia of trust that such users will instinctively grant well-known household brands), they are typically less interactive with such website, as compared to familiar websites or websites of well-known household brands. As an example, when accessing an unfamiliar website, users are more likely to withhold certain information related to themselves from the website, avoid granting the website permission to store such information, or abstain from engagements with the website. These and other drawbacks exist.

SUMMARY

Aspects of the invention relate to methods, apparatuses, and/or systems for facilitating presentation modification of a user interface based on data related to a user's email address or other user identifier.

In some embodiments, a system receives a user identifier (e.g., an email address, a phone number, etc.) of a user via a user interface associated with a third party. In response to receiving the user identifier, the system may generate a query for one or more user accounts associated with the user identifier (e.g., a request for data related to the user accounts from one or more verified data sources). Based on the query, a plurality of datasets associated with a plurality of user accounts may be received. A first dataset may be selected from the plurality of datasets for presentation modification of the user interface and cause modification of a presentation of the user interface based on one or more data items of the selected first dataset. For example, the modification may include (i) a change in the look and feel of the user interface (e.g., such that the user interface appears to be associated with a particular trusted entity), (ii) an insertion of the data items onto the user interface (e.g., such that the data items are visually presented at one or more portions of the user interface), or other presentation modification.

In some embodiments, a second identifier (e.g., a category identifier or other identifier) associated with the third party may be received in connection with receipt of the user identifier, and the system may select the first dataset over other datasets of the plurality of datasets based on the second identifier. For example, if the second identifier indicates a category, one or more category-related criteria may be determined, and the first dataset may be selected based on the category-related criteria and used to cause the modification of the user interface presentation.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
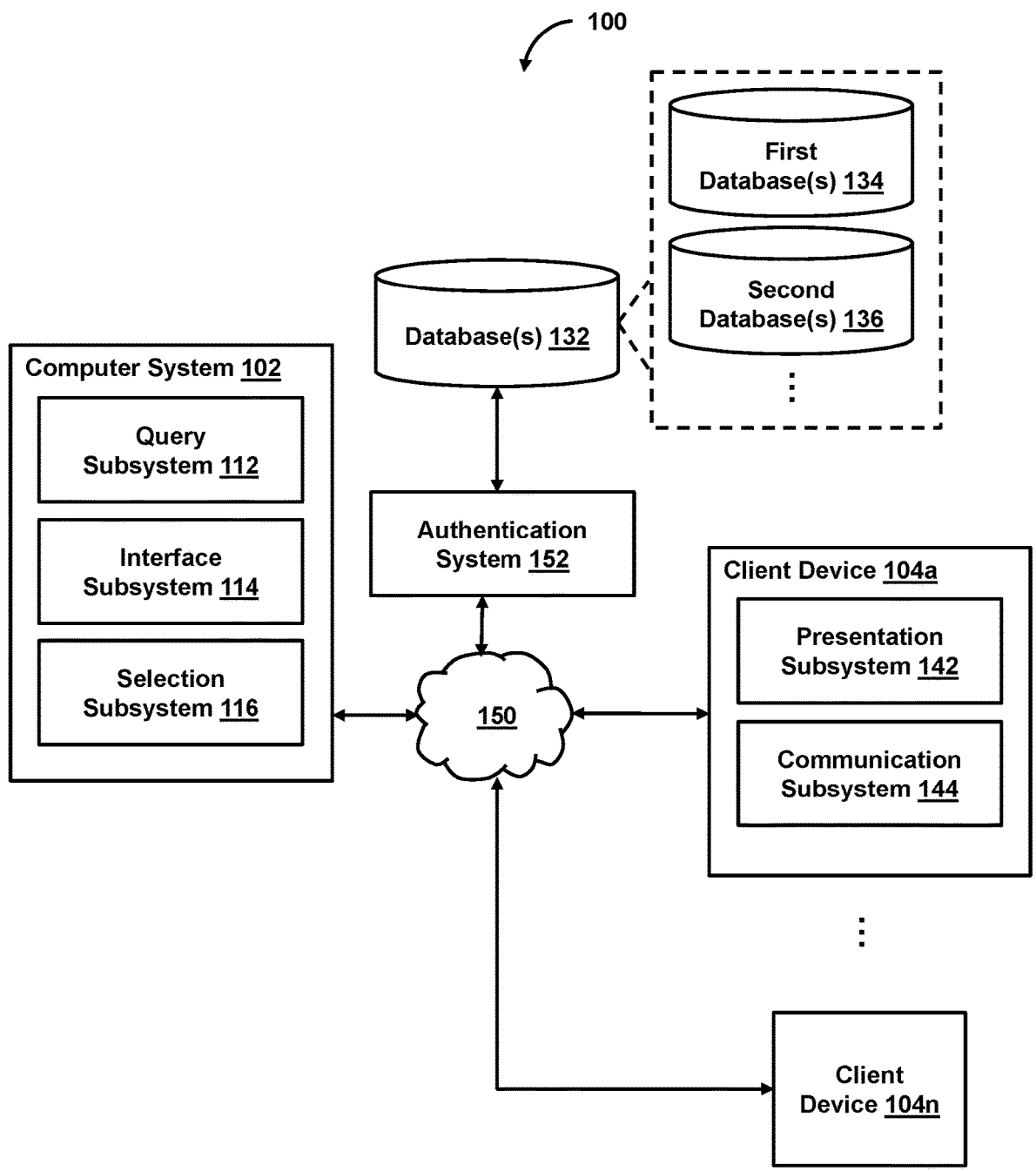
FIG. 1 shows a system for facilitating presentation modification of a user interface, in accordance with one or more embodiments.

FIG. 1 shows a system 100 for facilitating presentation modification of a user interface (e.g., accessible via a third-party website, an application programming interface (API), etc.) accessed by a user, in accordance with one or more embodiments. As shown in FIG. 1, system 100 may include computer system 102, client device 104 (or client devices 104a-104n), or other components. Computer system 102 may include query subsystem 112, interface subsystem 114, selection subsystem 116, or other components. Client device 104 may include presentation subsystem 142, communication subsystem 144, or other components. Each client device 104 may include any type of mobile terminal, fixed terminal, or other device. By way of example, client device 104 may include a desktop computer, a notebook computer, a tablet computer, a smartphone, a wearable device, a device on the cloud, or other client device. Users may, for instance, utilize one or more client devices 104 to interact with one another, one or more servers, or other components of system 100. It should be noted that, while one or more operations are described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of client device 104 or other components of system 100 and while one or more operations are described herein as being performed by components of client device 104, those operations may, in some embodiments, be performed by components of computer system 102 or other components of system 100.

In some embodiments, system 100 may facilitate presentation modification of a user interface (e.g., dynamic presentation modification of a third-party website) based on data related to a user identifier of a user. As discussed, as compared to familiar websites or websites of well-known household brands, users accessing an unfamiliar website (without the indicia of trust reflected of well-known household brands) are generally less interactive, tending to withhold certain information related to themselves from the website, avoid granting the website permission to store information, or abstain from engagements with the website. Such tendencies may thus unfairly and negatively taint the initial user experience with an unfamiliar website, thereby making it less likely for the user to be a repeat visitor in the near future. Even when users do return, such tendencies may likewise negatively affect the user experience during the return visit. As an example, users are often willing to store their payment information with a large online retailer, thereby enabling the large online retailer to further enhance the user experience for future repeat visits by reducing the amount of input that these users must enter to complete a transaction with the large online retailer. In contrast, small online retailers (e.g., "mom and pop" businesses) are unable to provide a similar experience for many users because users are less likely to store their payment information with such small online retailers.

To address one or more of the foregoing issues, in some embodiments, the system 100 enables modification of a presentation of a user interface to improve the user experience for a user. For example, with respect to a third-party website (e.g., a website unfamiliar to the user), the modification may include a change to a look and feel of the website to reflect a provider or brand trusted by the user, an insertion of data items related to an account of the user (e.g., that the user has with the trusted provider or brand) onto the website, or other presentation modification. In one use case, such modifications may be dynamically triggered during the user's first visit with the website upon obtaining some information from the user (e.g., an email address or other information that may be used to derive whether an account belongs to the user). In this way, for example, by updating the website presentation with one or more such indicia of trust, the system 100 may increase the user's comfort and trust level with the website, thereby improving the likelihood of greater engagement with the website and a better user experience with the website (e.g., during the user's first visit and future visits).

In some embodiments, the system 100 may cause modification of a presentation of a user interface associated with an entity based on one or more datasets associated with one or more user accounts (e.g., accounts that are not affiliated with the entity associated with the user interface or other accounts). In some embodiments, a user may input a user identifier or other user-related data to the user interface, and the system 100 may receive the user-related information via the user interface and obtain the datasets associated with the user account based on the user-related information to effectuate the presentation modification of the user interface. As an example, in response to receiving the user-related data via the user interface, the system 100 may generate a request for data related to one or more accounts of the user such that the request includes (i) the user-related data (e.g., the user identifier), (ii) data related to the user interface or the entity associated with the user interface (e.g., an entity identifier associated with the entity, a category associated with the user interface or the entity, etc.), or other data. Based on the request, the system 100 may receive and use the datasets associated with the user accounts to cause the presentation modification of the user interface.

In some embodiments, after obtaining a dataset associated with a user account based on a user identifier received via a user interface, the system 100 may provide at least one data item of the dataset to the third-party website to effectuate modification of a presentation of the user interface. As an example, in response to providing the data item, the user interface may be caused to present (or incorporate) the data item on the user interface. In some embodiments, after obtaining the dataset, the system 100 may provide, as at least one data item of the obtained dataset, one or more references to a set of graphics or other files associated with the user account to the user interface to effectuate the presentation modification of the user interface. As an example, in response to providing such references, the user interface may be caused to display one or more graphics (of the set of graphics) associated with the user account or otherwise present (or incorporate onto the user interface) one or more data items represented by the set of files.

In some embodiments, based on a user identifier received via a user interface, a plurality of datasets associated with a plurality of user accounts may be obtained. After obtaining the datasets, the system 100 may select a dataset over one or more other datasets of the plurality of datasets to effectuate modification of a presentation of the user interface based on the selected dataset. The selection of the dataset may be based on a compatibility criteria, a user preference (e.g., a user preference related to which type of account to prioritize), a third-party preference (e.g., a preference of a third-party associated with the user interface), or other selection criteria. For example, the system 100 may select a first dataset associated with a first account over a second dataset associated with a second account based on a determination that a processing system for processing transactions conducted via the user interface is compatible with an account type of the first account and incompatible with an account type of the second account.

Figure 2A:
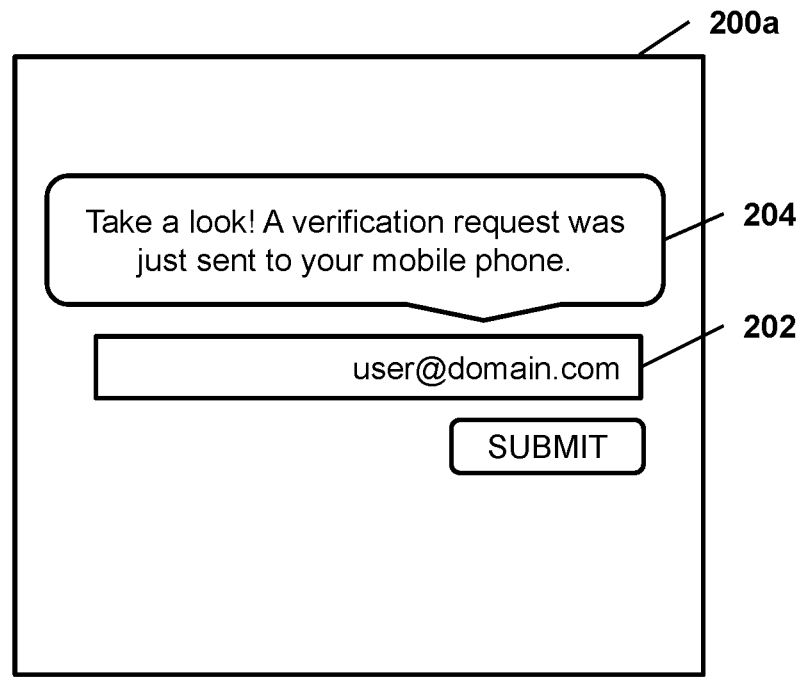
FIGS. 2A and 2B illustrate an example user interface for receiving a user identifier and a modified user interface that was modified based on data associated with the user identifier, in accordance with one or more embodiments.

In some embodiments, before obtaining one or more datasets associated with one or more user accounts based on a user identifier received via a user interface, an authorization may be requested from the user to retrieve the datasets. In some embodiments, the authorization may be requested via a message sent to a user device for the user to confirm so that the system 100 is authorized to receive the datasets from one or more trusted providers. For example, as shown in FIG. 2A, when the user enters an email address (e.g., user@domain.com) and hits a submit button on a user interface 200*a*, the system 100 may generate a message "Take a look! A verification request was just sent to your mobile phone." In some embodiments, the verification request sent to the mobile phone may be a verification code that the user must enter on the user interface to complete the verification process. After the user verifies that the user authorizes retrieving the datasets related to the user's accounts, the system 100 may send a request (e.g., a query) to the trusted providers for the respective datasets. Upon receipt of such datasets, the system 100 may use at least one of the datasets associated with the user accounts to cause the presentation modification of the user interface.

In some embodiments, after obtaining a user identifier via a user interface, the system 100 may perform suspicious activity detection to ensure that the user identifier was not provided in connection with fraudulent or other suspicious activity. In response to no suspicious activity being detected, the system 100 may generate a request related to one or more user accounts associated with the user identifier (e.g., a request for one or more datasets associated with one or more user accounts hosted at one or more trusted providers). On the other hand, when suspicious activity is detected, the system may not generate or send the request via one or more networks (e.g., to the trusted providers, an authentication system associated therewith, etc.). As such, networking and other computational resources (e.g., network bandwidth, processing power, memory, etc.) for generating the request for the datasets, receiving the datasets, communicating with a user for authentication, causing modification of a presentation of the user interface, or other related functions to be performed using the datasets can be avoided thereby improving efficiency and performance of the system 100.

In some embodiments, the computer system 102 may obtain a user identifier from a client device 104 or an external source (not illustrated). For example, the user identifier may be received by the computer system 102 via a user interface (e.g., a third-party website, an interface of a third-party mobile app, or other user interface) on the client device 104 being accessed by a user. In some embodiments, the user interface may be owned by a third party, such as a grocery store, clothing store, a gas station, a financial institution, or other third party, that requests a user to enter a user identifier (e.g., an email address). The third party may not have access to certain data associated with one or more accounts linked to the user identifier (e.g., the email address). As such, the dataset may be requested from verified entities (e.g., financial institutions, government agencies, etc.) to ensure the user is a verified user of at least one account linked to the user identifier.

In some embodiments, the computer system 102 may obtain the datasets (e.g., user account information, etc.) associated with the user identifier (e.g., an email address, a user id, a phone number, etc.) from one or more databases. In some embodiments, the databases 132 may be hosted by or otherwise accessible to one or more verifying entities, such as one or more institutions (e.g., trusted providers) with which one or more accounts associated with the user identifier is affiliated or hosted. The computer system 102 may also obtain additional data (e.g., graphics, logo, etc.) associated with the verifying entities. For example, the computer system 102 may generate a query to retrieve one or more datasets associated with the user identifier from one or more databases. The databases may be associated with one or more trusted providers (e.g., financial institutions) that are affiliated with or hosts one or more accounts of the user. For example, the first database may be associated with a first trusted provider hosting a first account of a user, and the second database may be associated with a second trusted provider hosting a second account of the user. In one use case, the first account may be an account at a first financial institution, and the second account may be an account at a second financial institution. The datasets associated with the user identifier and data related to the trusted provider may be further used to cause modification of a presentation of the user interface. As discussed herein, for example, the modification may include a change to a look and feel of the user interface to reflect a provider or brand trusted by the user, an insertion of data items related to an account of the user (e.g., that the user has with the trusted provider or brand) onto the website, or other presentation modification.

In some embodiments, after obtaining a user identifier, a query may be generated based on the user identifier to retrieve data from one or more databases. For example, the query may be configured to include the user identifier (e.g., an email address) and the databases from which the datasets are requested. In some embodiments, the query may be manipulated to extract particular data items requested by the user interface. For example, the computer system 102 may request a dataset including data items, such as an account name or type, an account holder name, an account number, a billing address, a shipping address, a reward scheme associated with the account, one or more other user identifiers, a user preference associated with the account, one or more references to data items related to the account, or other user-specific or account-specific information.

In some embodiments, a database may be preconfigured to provide limited data items in a dataset to the third-party. For example, the database may be preconfigured to provide datasets in a form of a data object (e.g., tables, array, etc.) with limited account details. Accordingly, a query may be manipulated to include a corresponding object to receive the preconfigured data object. In some embodiments, the pre-configured data object may include specific account information associated with a user identifier that can be sent to a requesting entity (e.g., the third-party) and exclude other information. For example, the preconfigured data object may provide information, such as username, one or more addresses, one or more accounts numbers, one or more reward codes, or other information configured to send to the third-party, and exclude information, such birth date, credit score, transaction history, marital status, or other usage or user-related data.

In some embodiments, an authentication system (e.g., an authentication system internal or external to computer system 102) may authenticate the computer system 102 to send or receive datasets to/from one or more databases 132. For example, the authentication system 152 generates an access control token to authenticate the computer system 102 to receive datasets from the database 132s. Based on the access control token, the computer system 102 may request the datasets associated with a user identifier of a user from the database 132s. In some embodiments, the access control token may be used to authenticate the computer system 102 to request datasets associated with multiple accounts of the user (e.g., multiple accounts affiliated with the same institution, multiple accounts affiliated with different institutions, etc.).

In some embodiments, the authentication system 152 determines whether a user authorizes sending of one or more datasets from the databases 132 to the computer system 102 or the client device 104. For example, in response to the computer system 102 providing a query for such datasets, the authentication system 152 sends a text, an email, or phone call to the client device 104 of the user for the user to authenticate the computer system 102 to receive datasets associated with user accounts from the database 132. In an example, the authentication system 152 sends a message (e.g., see 204 in FIG. 2A) indicating that the computer system 102 is requesting account information related to the user. Further, the client device 104 may prompt the user to approve retrieving the account information. In response to the user approving the data request, the authentication system 152 generates an access control token which may be valid within a time window. In other words, the access control token allows the query to fetch data from the database 132 within the time window, after which the access control token may expire. Upon expiry of the token, the token may not be used to access data from the databases 132.

In some embodiments, the query may be authenticated based on a token associated with a transaction card (e.g., a credit card, a debit card, etc.) of a user. For example, the client device 104 may generate a token via a transaction card (e.g., a credit card, a debit card, etc.), and the token may be verified by an institution (e.g., a bank) that issued the transaction card, thereby authorizing the computer system to receive a dataset related to the transaction card. For example, upon using a credit card on the user device (e.g., via tapping or swiping), the token may be transmitted to the computer system 102. In response to verification of the token as being valid, the authentication system 152 may authorize the computer system to obtain a dataset associated with an account corresponding to the verified token. In some embodiments, the computer system 102 may receive a plurality of tokens associated with a plurality of accounts of the user. As such, a plurality of datasets may be extracted from the databases 132 associated with the plurality of accounts. In some embodiments, a token associated with a transaction card may be used to authenticate the query for datasets associated with multiple accounts of the user (e.g., multiple accounts affiliated with the same institution, multiple accounts affiliated with different institutions, etc.).

In some embodiments, before providing the query to the authentication system 152, the computer system 102 may perform suspicious activity detection (e.g., a fraudulent transaction) to ensure that the request for datasets is not from a fraudulent user. In response to no suspicious activity being detected, the computer system 102 may provide the query to the authentication system 152 to obtain the plurality of datasets associated with the plurality of accounts from the databases 132. If a suspicious activity is detected, the query may not be sent to the authentication system 152 or the databases 132.

In some embodiments, the suspicious activity may be detected based on access data associated with one or more user devices (e.g., phone, desktop, laptop, etc.) used to access a user interface (e.g., a third-party website). The access data may include device identification data, one or more access times, one or more locations where the user interface was previously accessed, network data (e.g., local network data, public network data, etc.) associated with the network used to access the user interface, browser data associated with a browser used to access the user interface, or other access related data. In an example, the device identification data may include an IP address (e.g., local network IP address, home IP address, office IP address, etc.) associated with the user device, a hardware identifier (e.g., IMEI number) associated with the user device, or a browser ID associated with the user device. In some embodiments, the device identification data may be an identifier derived from hashing the IP address, the hardware identifier, or the browser ID.

In an example, the computer system 102 may receive access data associated with one or more user devices of the user such as one or more phones, desktops, and laptops. Based on the access data, the computer system 102 may perform suspicious activity detection associated with the user identifier. In some embodiments, suspicious activity may be detected by comparing data items within the access data. For example, the computer system 102 may extract, from the access data, device identification data associated with the user device and an access time (e.g., a date and time) associated with the user device's access of the user interface. Based on the device identification data and the access time, the computer system 102 may determine usage data (e.g., frequency, location, time, network) related to use of the device identification data or the user identifier (e.g., an email address, a phone number, etc.) for obtaining one or more datasets of the plurality of datasets from the databases 132. In some embodiments, usage data related to use of APIs or websites that are not related to the user interface (e.g., of the third-party) may be excluded. The computer system 102 may determine whether the usage data satisfies a set of validation criteria. For example, the validation criteria may be a threshold frequency within a duration of access time, a time of the day, a threshold number of IP addresses, a distance between locations at which user device was used, a threshold frequency of using a secured local network (or public network), or other usage related criteria. Further, in response to the usage data (e.g., frequency of use within a time window) satisfying a set of validation criteria (e.g., a frequency threshold for the time window), the computer system 102 may provide the query to an authentication system to obtain the plurality of datasets.

In another example, the computer system 102 receives, via a third-party website that is used to enter the user identifier (e.g., an email address), first access data associated with a user device of the user in connection with the receipt of the email address and a category (e.g., grocery, gas pump, clothing, or restaurant) of the third-party. The first access data includes, for example, device identification data associated with the user device and an access time associated with the user device's access of the third-party website. The computer system 102 also receives, based on the access time, second access data associated with one or more user devices. The second access data may be related to a plurality of accesses of one or more third-party websites that occurred within a threshold time (e.g., 1 hour, 5 hour, 1 day, 5 days, etc. time window) of the access time. The computer system 102 determines, based on the device identification data and the second access data, usage data (e.g., frequency, location, time, IP address) related to use of the device identification data or use of the email address for obtaining the first dataset of the second dataset. In response to the usage data satisfying a set of validation criteria (e.g., a frequency threshold for the time window), the computer system 102 provides the query to an authentication system to obtain the first dataset and the second dataset.

In some embodiments, the computer system 102 may select a dataset associated with an account from a plurality of datasets to effectuate presentation modification of a user interface. For example, each such dataset associated with an account may include data items related to the account, such as an account name or type, an account holder name, an account number, a billing address, a shipping address, a reward scheme associated with the account, one or more other user identifiers, a user preference associated with the account, one or more references to data items related to the account, or other user-specific or account-specific information. As another example, the selection of the dataset may be based on a compatibility criteria, a user preference (e.g., a user preference related to which type of account to prioritize), a third-party preference (e.g., a preference of a third-party associated with the user interface), a category criteria, a benefit criteria, or other selection criteria.

In some embodiments, the computer system 102 selects a dataset based on whether an account associated with the dataset is compatible with a data or transaction processing system used by an entity associated with the user interface. As an example, if a processing system for processing transactions conducted via the user interface is compatible with an account type of a first account associated with a first dataset and incompatible with an account type of a second account associated with a second dataset, the computer system 102 may select the first dataset over the second dataset based on the foregoing compatibility determination. In one use case, if the processing system used by the third party does not accept a particular payment type (e.g., Discover, American Express, Bitcoin, etc.), the computer system 102 may avoid selecting any of the datasets associated with accounts that correspond to the non-acceptable payment types. The computer system 102 may instead select from among the subset of datasets associated with accounts that correspond to acceptable payment types to effectuate presentation modification of the user interface.

In some embodiments, the computer system 102 selects a dataset based on a comparison of data items within the datasets obtained from the databases 132. For example, such a comparison may include comparing data items within the first dataset associated with the first account, comparing data items within the second dataset associated with the second account, or comparing data items of the first dataset with data items of the second dataset. In an example, the computer system 102 determines a first value from a first dataset and a second value from a second dataset of the plurality of datasets. The first value and the second value may be related to an identifier (e.g., a category such as grocery, gas station, clothing, etc.) associated with a merchant (or other entity). For example, the first value may be a first reward percentage offered by the first account (e.g., "Quicksilver" credit card). For example, the first account offers a flat 1.5% reward on all categories, a 5% reward on grocery, or other reward values. The second value may be a second reward percentage offered by the second account (e.g., "Venture One" credit card). For example, the second account offers a flat 1% reward, a 5% reward on gas stations, or other reward values.

The first and second values may be determined based on one or more categories applicable to the third party or the user interface, and the computer system 102 may determine which of the first and second values is greater. For example, a category of the third-party may be a grocery store. Accordingly, the first value may be 5% and the second value may be 1% (a flat reward for any category). Based on the first value (e.g., 5%) being greater than the second value (e.g., 1%), the computer system 102 may select the first dataset over the second dataset for presentation modification of the user interface. As an example, the modification may be performed based on the first dataset that includes an account name or type, an account holder name, an account number, a billing address, a shipping address, one or more media items, or other data items (or one or more references to the foregoing) associated with the first account (e.g., "Quicksilver" credit card). In one use case, the modification may result a credit card brand logo and background along with an image of a credit card (e.g., where the account name or type, the account holder name, the account number, and the zip code is depicted on the credit card image).

In some embodiments, based on a selected dataset associated with an account of a user (e.g., selected from a plurality of datasets associated with a plurality of accounts of the user), the computer system 102 may generate one or more additional offers for the user. In some embodiments, the additional offers may include a one-time cash back reward, reward points or discounts, or a promotional offer reward. For example, based on the second identifier of the third-party (e.g., category of the third party), additional reward points or discounts may be offered based on a product offered by the third-party.

In some embodiments, the computer system 102 provides the selected dataset to effectuate the presentation modification of the user interface. For example, one or more portions of the user interface may be labeled with one or more tags indicating the data items to be incorporated onto the respective portions of the user interface. Additionally, or alternatively, the data items of the selected dataset may be labeled with one or more corresponding tags indicating the respective portions of the user interface on which the data items are to be incorporated. In one scenario, where the user interface corresponds to a third-party website, the selected dataset may be sent to the third-party system hosting the third-party website, and the tags of the selected dataset may be parsed to determine the corresponding data items and one or more regions of the third-party web site onto which the data items are to be inserted. For example, the user interface may be programmed using CSS, HTML, Java, or other coding languages to receive one or more media items or other data items (e.g., based on the tags of the labeled selected dataset). In one use case, with respect to FIG. 2B, the user interface 200b may be programmed to include one or more tags associated with the regions at which the respective data items 212-226 are shown.

In some embodiments, the selected dataset (e.g., account information, graphics, etc.) may be used to cause modification of the user interface (e.g., a third-party website) on the client device 104 by inserting data items from the selected dataset or changing the look and feel of the user interface to reflect a trusted provider or brand. For example, the third-party website may be modified to insert one or more fields on the user interface and cause the inserted fields to be automatically filled with data items from the selected dataset, such as an account name or type, an account holder name, an account number, and a shipping address. As such, the user is provided with ease of use of the interface. For example, a user may only enter a user identifier (e.g., an email address) on a first screen, and the presentation modification of the user interface automatically results in data items of the selected dataset being inserted onto the user interface. Thus, the user may not need to perform manual entry of additional information on a third-party website, for example. Additionally, as the selected dataset is obtained from a reliable source (e.g., a bank with which the associated account is affiliated or other trusted provider), the third-party reaps the benefit of automatic verification of the user. Also, the third-party is not bound to store sensitive account information or maintain databases storing such information. As discussed, users are often willing to store their payment information with a large online retailer, thereby enabling the large online retailer to further enhance the user experience for future repeat visits by reducing the amount of input that these users must enter to complete a transaction with the large online retailer. By enabling small online retailers (e.g., "mom and pop" businesses) to provide such enhancements via the foregoing techniques—even where the small online retailers do not store users' payment information or other user data, the user experience for the users of the small online retailer will be improved.

In some embodiments, the selected dataset of an account may include references to graphical elements related to the account, which may be used to cause the user interface to look and feel like a web site related to the account. For example, references to graphical elements (e.g., a color scheme, patterns, logo, etc.) of a bank (e.g., "Capital One") of the selected dataset may be used to load the graphical elements on the third-party website to facilitate transformation of the user interface into an interface having the looks and feel of a website of a trusted provider or brand (e.g., the bank with which the account is affiliated)). Thus, for example, the user may see a familiar user interface while completing a transaction or performing other activities via the user interface.

FIG. 2A illustrates an exemplary user interface 200a of a third-party website. The user interface 200a includes a field 202 to enter a user identifier (e.g., an email address). A user may enter, for example, an email address "user@domain.com" in the field 202. The email address "user@domain.com" may be received by the computer system 102. In response to receiving the email address "user@domain.com", the computer system 102 may query the database 132 to receive one or more datasets associated with one or more accounts of the user. In response to receiving the datasets, the computer system 102 selects relevant data for modification of a presentation of the user interface 200a. Based on the selected dataset, the presentation of the user interface 200a is modified to a user interface 200b, as shown in FIG. 2B.

In some embodiments, when the user enters the email address "user@domain.com" at 202 and hits the submit button, an authentication operation may be performed before receiving the datasets related to the email address "user@domain.com." For example, the authentication check may prompt a message 204 (e.g., "Take a look! A verification request was just sent to your mobile phone") on the user interface 200a to confirm a request for datasets associated with one or more accounts of the user. Once the user authorizes receiving the datasets related to the email address "user@domain.com," the computer system 102 selects the relevant dataset, and causes the presentation modification of the user interface 200a to the user interface 200b (see FIG. 2B) based on the selected dataset.

Figure 2B:
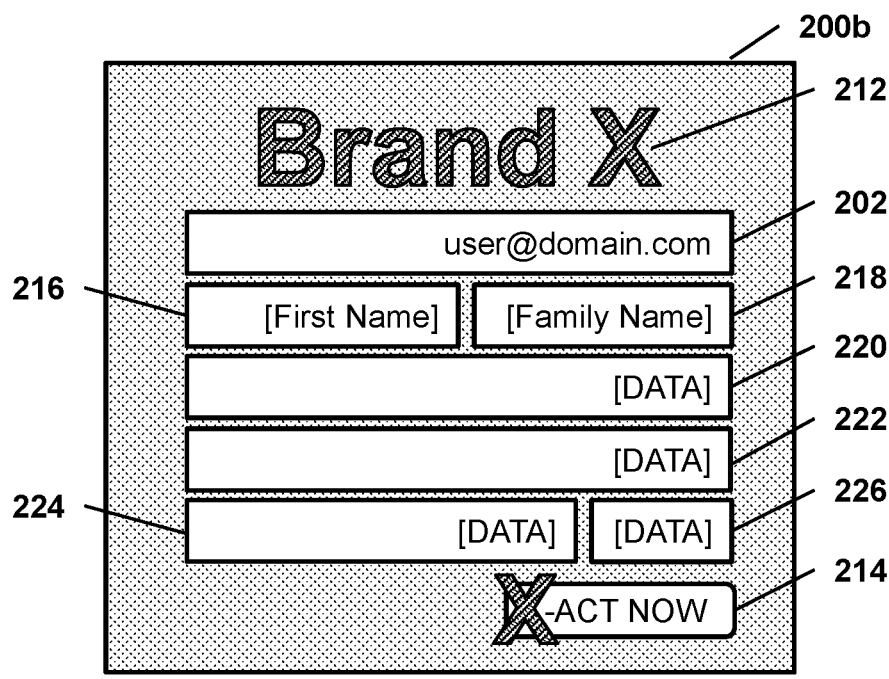

FIG. 2B is only an exemplary presentation modification of the user interface 200a to user interface 200b based on the selected dataset. Compared to the user interface 200a, the user interface 200b includes the email address "user@domain.com" originally entered by the user at the user interface 200a (in FIG. 2A) and additionally includes graphic elements and other data related to the selected dataset. For example, the user interface 200a is modified to include data items 212-226 and the new background. As shown, the presentation of the user interface 200b includes data item 212 associated with a user familiar brand (e.g., the "Brand X" logo), a background related to the familiar brand (e.g., "Brand X") and the data item 214 (e.g., the "X-Act now" button 214 related to "Brand X") that causes the user interface 200b to look and feel like that of "Brand X.". Additionally, or alternatively, the background may be a user-preferred background (e.g., a background related to "Brand X", a background pre-selected by the user associated with the email address, etc.). Moreover, as shown, the modified user interface 200b may include other data items of the selected dataset, such as a first name 216 and a family name 218), the data item 220 (e.g., street name), the data item 222 (e.g., a city), the data item 224 (e.g., state), and the data item 226 (e.g., zip code).

In some embodiments, the selected dataset includes one or more additional offers offered by the third party associated with the user interface. As an example, the computer system 102 may cause modification of the user interface to allow user selection of one or more of the additional offers. In one use case, one or more fields or other components may be added to the presentation of the user interface via which the user may select one or more of the additional offers (e.g., adding one or more check boxes, a drop-drop menu, or other selectable components). As a further example, based on the selected offer, the user interface may be modified to present one or more updated amounts displayed on the user interface. In one scenario, a transaction total for an order of items selected by the user may be displayed on the user interface, and the transaction total may be updated to reflect an additional discount offered by the third party in response to the user selecting a newly-added check box corresponding to application of the additional discount to the transaction total.

Subsystems 112, 114, 116, 142 and 144

In some embodiments, the query subsystem 112 implements functions related to generating a query and providing the query to the database 132, as discussed above. For example, the query subsystem 112 receives a user identifier from a user interface. Based on the user identifier (e.g., an email address), the query subsystem 112 generates a query to retrieve data associated with the user identifier from the database 132. For example, the data may be related to one or more accounts associated with the user identifier. In some embodiments, the query subsystem 112 may manipulate the query to request specific data associated with the accounts. For example, the requested data may be an account name or type, account holder name, an account number, a billing address, a shipping address, a reward scheme associated with the account, one or more other user identifiers, a user preference associated with the account, one or more references to data items related to the account, or other user-specific or account-specific information.

In some embodiments, the query subsystem 112 may manipulate the query to include an authentication indicator that indicates whether the query request is authenticated by a user. In some embodiments, the authentication may be provided by the authentication system 152. For example, if the query is not authenticated, the request for data may not be sent to the database. Alternatively, if not authenticated, the data may not be sent to the user interface. In response to the query, the data associated with one or more user accounts is received by the computer system 102.

In some embodiments, the selection subsystem 116 implements functions related to selection of data (e.g., received from the database 132) to cause modification of a presentation of a user interface (e.g., on a client device 104). For example, upon receiving data associated with the user accounts, the selection subsystem 116 may select one or more datasets associated with one or more user accounts over one or more other datasets associated with one or more other user accounts. In some embodiments, the selection is based on comparing of a first dataset associated with a first account and a second dataset associated with a second account to identify the associated account having a higher benefit (e.g., a higher reward) for the user. For example, the second account may offer a higher flat reward (e.g., 1.5% on all categories) compared to the first account. However, for a particular category (e.g., grocery) of the third-party, the first account may have a higher reward (e.g., 5%) compared to the second dataset. In this case, the first dataset may be selected over the second dataset because the user would benefit more from use of the first account over use of the second account.

In an embodiment, the selection may be based on a compatibility criteria, a user preference (e.g., a user preference related to which type of account to prioritize), a third-party preference (e.g., a preference of a third-party associated with the user interface), or other selection criteria. For example, the user may prefer using the second account over the first account because the second account offers higher travel rewards. In another example, the third party may prefer the second account over the first account because the second account may charge lower merchant fees. In some embodiments, the selection may be based on additional offers that the third-party may offer on the first account versus on the second account. In this case, a cumulative benefit may be computed for each of the first account and the second account. Based on a higher cumulative benefit (e.g., account specific reward and additional reward by the third-party), data related to the first account may be selected over the second account. One or more of the foregoing preferences may be used to select one or more datasets from a plurality of datasets associated with accounts of the user.

In some embodiments, the presentation subsystem 142 of the client device 104 modifies, based on the selected dataset, the user interface on the client device 104. The presentation subsystem 142 may receive (via the communication subsystem 144 and the network 150) the selected dataset from the interface subsystem 114. In some embodiments, the presentation subsystem 142 initially displays a user interface for a user to enter a user identifier (e.g., email address), as shown in FIG. 2A. In response to receiving the selected dataset, the presentation subsystem 142 may extract the selected dataset and integrate one or more data items of the selected dataset into the user interface. For example, FIG. 2B illustrates an example modification of the presentation of the user interface 200a to the user interface 200b, where account-specific graphics are displayed along with the data from the first dataset, as discussed herein.

In some embodiments, for example, the presentation subsystem 142 may incorporate one or more components (e.g., data objects, graphic elements, etc.) to be displayed on the user interface. As an example, the components may be programmed to receive data items from the selected dataset (e.g., an account name or type, an account holder name, addresses, graphics, audio, video, etc.). Once the component is populated with the selected dataset, the user interface presented on the client device 104 is modified based on the selected dataset. In an embodiment, the presentation subsystem 142 may manipulate a layout of the user interface according to a size of data items in the selected dataset.

In some embodiments, the client device 104 communicates with other devices or databases via, for example, the communication subsystem 144. For example, the client device 104 may communicate, via the communication subsystem 144, with the authentication system 152 or the database 132. For example, the client device 104 may receive a text, an email, or a phone call to authenticate a retrieval of data associated with a user identifier from the database 132.

Example Flowchart

Figure 3:
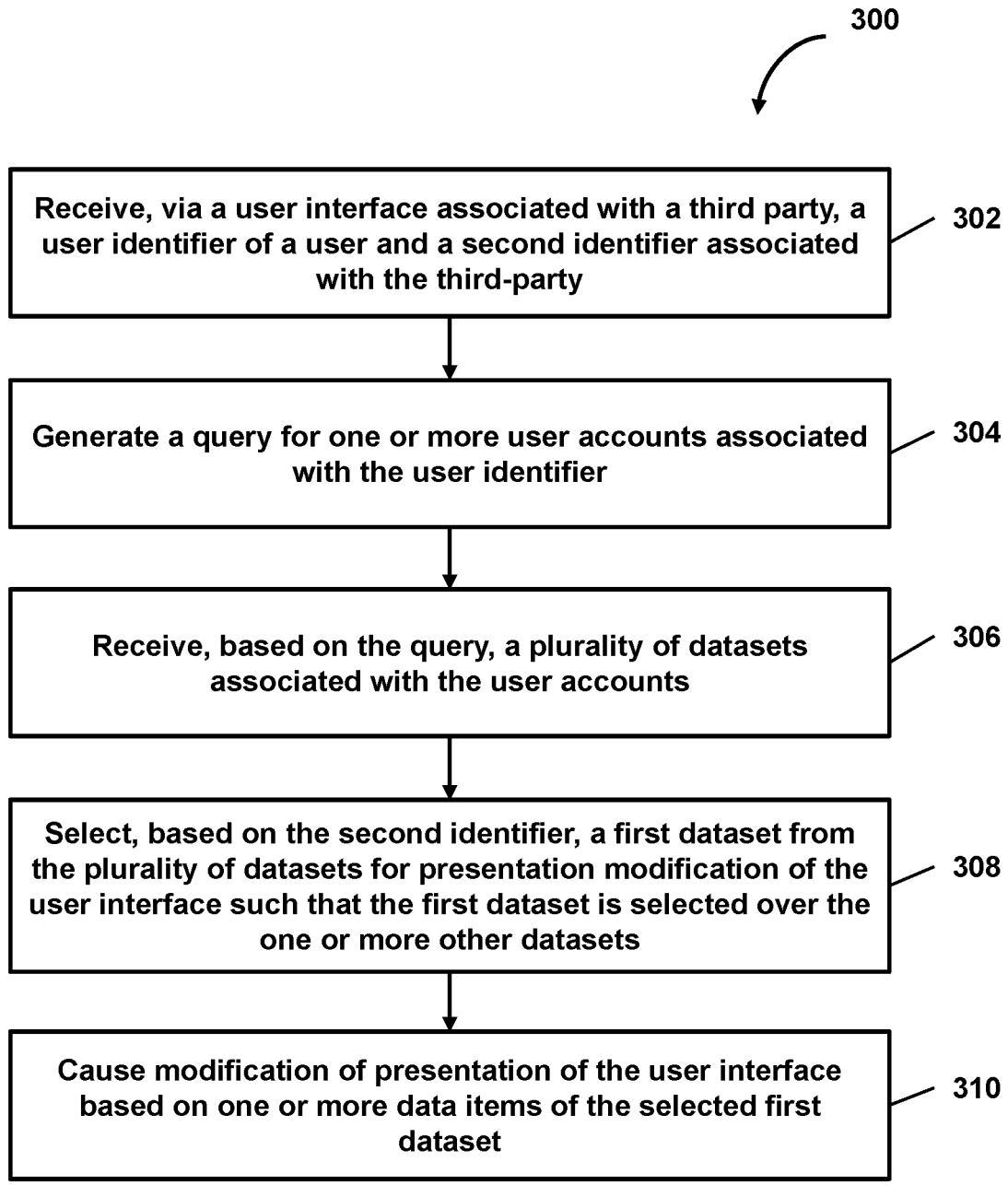
FIG. 3 shows a flowchart of a method of facilitating presentation modification of a user interface, in accordance with one or more embodiments.

FIG. 3 is an example flowchart of processing operations of methods that enable the various features and functionality of the system as described in detail above. The processing operations of the method presented below is intended to be illustrative and non-limiting. In some embodiments, for example, the method may be accomplished with one or more additional operations not described, and/or without one or more of the operations discussed. Additionally, the order in which the processing operations of the methods are illustrated (and described below) is not intended to be limiting.

In some embodiments, the method may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the method in response to instructions stored electronically on an electronic storage medium. The processing devices may include one or more devices configured through hardware, firmware, and/or software to be specifically designed for execution of one or more of the operations of the method.

FIG. 3 shows a flowchart of a method 300 for facilitating presentation modification of a user interface, in accordance with one or more embodiments. In some embodiments, the method 300 may be implemented via the subsystems of the computer system 102. As an example, the method 300 may cause modification to the presentation of the user interface in response to a user only inputting a user identifier (e.g., an email address) into the user interface. In some embodiments, the user interface may be modified based on a particular dataset associated with an account of the user. The modification includes, for example, displaying the dataset, providing a look and feel of an interface related to a user account, or other modifications related to data associated with the user identifier and the third-party.

In an operation 302, a user identifier of a user may be received via a user interface. For example, the user interface may be associated with a third party. In some embodiments, a second identifier (e.g., a category) associated with the third-party may also be received. As an example, a user may input a user identifier (e.g., an email address, a phone number, username, etc.) at a third-party website (e.g., on a client device 104). This user identifier (e.g., an email address) may be received via the third-party website by the computer system 102. Additionally, a category (e.g., grocery, gas station, restaurant, clothing, etc.) associated with the third-party website may also be received from the third-party website by the computer system 102. Operation 302 may be performed by a subsystem that is the same as or similar to interface subsystem 114, in accordance with one or more embodiments.

In an operation 304, a query for one or more user accounts associated with the user identifier may be generated. As an example, the query may be generated to initiate retrieval of data associated with one or more user accounts (of the user) with an institution (e.g., a financial institution, government, an organization where the user works, etc.). For example, a first account may be with a first bank account, and a second account may be with a second bank. In some embodiments, the query may be manipulated according to the present disclosure. For example, as discussed herein, the query may be manipulated to request specific data related to the user accounts (e.g., account name or type, account holder name, account number, reward, etc.), data related to the institution at which each user account is registered, an authentication indicator to enable the query to request data from a database, or other manipulations to generate the query. Operation 304 may be performed by a subsystem that is the same as or similar to query subsystem 112, in accordance with one or more embodiments.

In some embodiments, the query may be provided to an authentication system. For example, the computer system 102 may receive a token via a transaction card associated with an account of the user. In response to verification of the token as being a valid token, the computer system 102 may provide the query to an authentication system 152 to obtain the datasets associated with the accounts. For example, the datasets may include a first dataset associated with a first account of the user, a second dataset associated with a second account of the user, and so on.

In some embodiments, in response to providing the query to the authentication system 152, the authentication system 152 is caused to determine whether the user authorizes sending of the first dataset or the second dataset.

In some embodiments, the query may be provided to the database based on whether a suspicious activity is detected. For example, a fraudulent user may be accessing multiple websites of the third party using different user devices and different networks. Such fraudulent requests may be identified, and the query may not be sent to the database 132. For example, the suspicious activity may be detected by analyzing access data associated with one or more user devices used to access the third-party website.

In some embodiments, access data associated with a user device of the user may be received. Based on the access data, the method 300 performs suspicious activity detection associated with the user identifier. Further, in response to no suspicious activity being detected, the generated query may be provided the authentication system 152 to obtain the datasets associated with the user accounts.

In some embodiments, the method 300 may perform suspicious activity detection based on access data obtained from a user device (e.g., the client device 104). For example, the method 300 may extract, from the access data, device identification data associated with the user device and an access time associated with the user device's access of the user interface. Based on the device identification data and the access time, usage data related to use of the device identification data or the user identifier may be determined. In response to the usage data satisfying a set of validation criteria, the query may be provided to the authentication system 152 to obtain the datasets. In an embodiment, the device identification data comprises an IP address associated with the user device, a hardware identifier associated with the user device, a browser ID associated with the user device, or a derived identifier (e.g., derived from hashing the IP address, the hardware identifier, or the browser ID). Examples of detecting suspicious activity based on access data are discussed with respect to FIG. 1 above.

In an operation 306, a plurality of datasets associated with the user accounts may be received based on the query. In some embodiments, the plurality of user accounts may be associated with a plurality of entities. For example, a first account may be associated with a first entity (e.g., a first financial institution), and a second account may be associated with a second entity (e.g., a second financial institution) different from the first entity. In some embodiments, the plurality of datasets may be received from the same entity (e.g., the first entity or the second entity). In some embodiments, each dataset of the plurality of datasets may be distinct from one or more other datasets of the plurality of datasets. For example, a first dataset from the first database 134 may be distinct from a second dataset from the second database 136. In an embodiment, each dataset includes account information, such as an account name or type, an account holder name, an account number, a billing address, an account type, a balance in the account, a credit limit on the account, one or more other user identifiers, a user preference associated with the account, one or more references to data items related to the account, or other account related details. Operation 306 may be performed by a subsystem that is the same as or similar to interface subsystem 114, in accordance with one or more embodiments.

In an operation 308, a first dataset may be selected from the plurality of datasets for presentation modification of the user interface. In an embodiment, the first dataset may be selected over the other datasets based on relative benefits of each dataset. For example, the benefit may be a discount value, reward points, travel points, or other values quantifying the benefit associated with each of an account. Operation 308 may be performed by a subsystem that is the same as or similar to selection subsystem 116, in accordance with one or more embodiments.

In an example, a first value for the first dataset and a second value for the second dataset of the plurality of datasets may be determined. For example, the first value and the second value may be a reward percentage, such as a flat reward (e.g., 1% cash back for all categories), or a category-dependent reward (e.g., different reward values for grocery, gas station, and restaurant purchases). If the first value is greater than the second value, the first dataset may be selected over the second datasets for presentation modification of the user interface.

In some embodiments, the selection may be based on user preference, a third-party preference, or a combination thereof. For example, the user may prefer using a first account, the third-party may offer additional benefits for a particular account, or the third-party may prefer using a particular account (e.g., due to low transaction fees). In this case, a cumulative benefit may be computed based on, for example, the first value (or second value), the user preference, the third-party preference and offers. Based on the cumulative benefit, the first dataset may be selected over the second dataset, or vice-versa.

In an operation 310, a modification of a presentation of the user interface may be caused based on one or more data items of the selected first dataset. In an example, causing modification of the presentation of the user interface includes providing, as at least one data item of the selected first dataset, one or more references (e.g., location to images, logos, URL link, etc.) to a first set of graphics associated with the first account (e.g., "Quicksilver") to the user interface. In some embodiments, the graphics may be stored in the database 132, publicly available on one or more websites, or stored at a third-party database (not illustrated). In response to providing the references, the user interface is caused to display the first set of graphics associated with the first account. For example, as show in FIG. 2B, the references to the first set of graphics may be a logo, a color scheme, a background pattern, etc. associated with the first account (e.g., "Quicksilver"). Thus, upon modification based on such graphics, the user gets the look and feel of an interface associated with the first account (e.g., "Quicksilver"). Operation 310 may be performed by a subsystem that is the same as or similar to interface subsystem 114, in accordance with one or more embodiments.

In some embodiments, the various computers and subsystems illustrated in FIG. 1 may include one or more computing devices that are programmed to perform the functions described herein. The computing devices may include one or more electronic storages (e.g., database(s) 132, which may include the first database(s) 134, the second database 136, etc., or other electronic storages), one or more physical processors programmed with one or more computer program instructions, and/or other components. The computing devices may include communication lines or ports to enable the exchange of information within a network (e.g., network 150) or other computing platforms via wired or wireless techniques (e.g., Ethernet, fiber optics, coaxial cable, Wi-Fi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-116,142-144, or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-116 and 142-144 described herein is for illustrative purposes, and is not intended to be limiting, as any of subsystems 112-116 and 142-144 may provide more or less functionality than is described. For example, one or more of subsystems 112-116 and 142-144 may be eliminated, and some or all of its functionality may be provided by other ones of subsystems 112-116 and 142-144. As another example, additional subsystems may be programmed to perform some or all of the functionality attributed herein to one of subsystems 112-116 and 142-144.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present disclosure contemplates that, to the extent possible, one or more features of any embodiment can be combined with one or more features of any other embodiment.

The present techniques will be better understood with reference to the following enumerated embodiments:

1. A method includes: obtaining a user identifier via a user interface; determining a first dataset from a plurality of datasets associated with the user identifier for presentation modification of the user interface; and causing modification of a presentation of the user interface based on one or more data items of the first dataset.
2. The method of embodiment 1, wherein obtaining the user identifier includes receiving, via the user interface associated with a third party, the user identifier of a user and a second identifier associated with the third party.
3. The method of embodiment 1 or 2, wherein the user identifier is obtained in response to a user inputting an email address at a third-party website associated with a third party.
4. The method of any of embodiments 1-3, further including receiving, via the third-party website, a category associated with a third-party website.
5. The method of any of embodiments 1-4, wherein obtaining a plurality of datasets includes generating a query for one or more user accounts associated with the user identifier, and receiving, based on the query, the plurality of datasets associated with a plurality of user accounts, each of the plurality of datasets being distinct from one or more other datasets of the plurality of datasets.
6. The method of embodiment 5, wherein the query is generated in response to receiving the email address.
7. The method of any of embodiments 1-6, wherein determining the first dataset includes selecting, based on a second identifier, the first dataset from the plurality of datasets for presentation modification of the user interface such that the first dataset is selected over the one or more other datasets.
8. The method of any of embodiments 1-7, wherein determining the first dataset includes determining, based on the second identifier, a first value from a first dataset and a second value from a second dataset of the plurality of datasets; determining whether the first value is greater than the second value; and selecting, based on the first value being greater than the second value, the first dataset over the one or more other datasets for presentation modification of the user interface.
9. The method of any of embodiments 1-8, wherein causing modification of the presentation of the user interface includes providing, as at least one data item of the selected first dataset, one or more references to a first set of graphics associated with the first account to the user interface, wherein, in response to providing the one or more references, the user interface is caused to display the first set of graphics associated with the first account.
10. The method of any of embodiments 1-9, wherein causing modification of the presentation of the user interface includes providing at least one data item of the first dataset to the user interface, wherein, in response to providing the at least one data item, the user interface is caused to display the at least one data item.
11. The method of any of embodiments 1-10, further includes receiving a token via a transaction card associated with an account of the plurality of accounts; and in response to verification of the token as being a valid token, providing the query to an authentication system to obtain the plurality of datasets associated with the plurality of accounts.

12. The method of any of embodiments 1-11, further includes providing the query to an authentication system to obtain the first dataset and the second dataset, wherein, in response to providing the query, the authentication system is caused to determine whether the user authorizes sending of the first dataset or the second dataset.

13. The method of any of embodiments 1-12, further includes receiving access data associated with a user device of the user; performing, based on the access data, suspicious activity detection associated with the user identifier; and, in response to the suspicious activity detection indicating no suspicious activity, providing the query to an authentication system to obtain the plurality of datasets associated with the plurality of accounts.

14. The method of embodiment 13, wherein performing the suspicious activity detection includes: extracting, from the access data, device identification data associated with the user device and an access time associated with the user device's access of the user interface; determining, based on the device identification data and the access time, usage data related to use of the device identification data or the user identifier for obtaining one or more datasets of the plurality of datasets; and, in response to the usage data satisfying a set of validation criteria, providing the query to an authentication system to obtain the plurality of datasets.

15. The method of embodiment 14, wherein the device identification data comprises an IP address associated with the user device, a hardware identifier associated with the user device, a browser ID associated with the user device, or a derived identifier derived from hashing the IP address, the hardware identifier, or the browser ID.

16. A system comprising a computer system that comprises one or more processors programed with computer program instructions that, when executed, cause the computer system to perform operations comprising those of any of embodiments 1-15.

17. One or more non-transitory, computer-readable media storing instructions that, when executed by one or more processors, effectuate operations comprising those of any of embodiments 1-15.

What is claimed is:

1. A system to facilitate presentation modification of a third-party website associated with a third party, where the presentation modification is (i) initiated in response to a user inputting an email address at the third-party website and (ii) based on data related to a user account that is not affiliated with the third party, the system comprising:
a computer system comprising one or more processors programmed with computer program instructions that, when executed, cause operations comprising:
in response to a user inputting an email address at a purchase transaction user interface on a third-party website associated with a third party, receiving, via the third-party website, the email address and a category associated with the third-party website;
in response to receiving the email address, generating a query for one or more user accounts associated with the email address;
receiving, based on the query, a first dataset associated with a first user account from a first database of a first entity and a second dataset associated with a second user account from a second database of a second entity different from the first entity, the first and second datasets being received respectively from the first and second databases in response to the query, wherein the first and second user accounts are not affiliated with the third party;
selecting, based on the category associated with the third-party website, the first dataset such that the first dataset is selected over the second dataset for presentation modification of the third-party website based on a determination that the first dataset comprises a first value for the category is greater than a second value of the second dataset for the category; and
causing modification of a presentation of the purchase transaction user interface on the third-party website based on one or more data items of the selected first dataset such that payment information of the selected first dataset is displayed on the purchase transaction user interface in response to the user inputting the email address at the purchase transaction user interface on the third-party website.

2. The system of claim 1, wherein causing modification of the presentation of the third-party web site comprises:
providing, as at least one data item of the selected first dataset, one or more hyperlinks to a first set of graphics associated with the first user account to the third-party website,
wherein, in response to providing the one or more hyperlinks to the first set of graphics associated with the first user account, the third-party website is caused to display the first set of graphics associated with the first user account on the purchase transaction user interface on the third-party website.

3. The system of claim 1, wherein one or more other datasets associated with one or more other user accounts are received based on the query, and wherein the first dataset is selected for presentation modification of the third-party website over the one or more other datasets based on a determination that the one or more other user accounts correspond to a non-compatible payment type that is not compatible with a transaction processing system for the purchase transaction user interface.

4. The system of claim 1, wherein one or more other datasets associated with one or more other user accounts are received based on the query, and wherein the first dataset is selected for presentation modification of the third-party website over the one or more other datasets based on a determination that the one or more other user accounts do not correspond to a payment type accepted by a transaction processing system for the purchase transaction user interface.

5. A method comprising:
receiving, via a purchase transaction user interface associated with a third party, a user identifier of a user and a category associated with the third party;
generating a query for one or more user accounts associated with the user identifier;
receiving, based on the query, a plurality of datasets associated with a plurality of user accounts, each of the plurality of datasets being distinct from one or more other datasets of the plurality of datasets;
selecting, based on the category associated with the third party, a first dataset from the plurality of datasets for presentation modification of the purchase transaction user interface such that the first dataset is selected over the one or more other datasets based on a determination that the first dataset comprises a first value for the category is greater than or equal to a second value of at least one of the one or more other datasets for the category; and causing modification of a presentation of the purchase transaction user interface based on one or more data items of the selected first dataset such that payment information of the selected first dataset is displayed on the purchase transaction user interface.

6. The method of claim 5, wherein causing modification of the presentation of the purchase transaction user interface comprises:
providing, as at least one data item of the selected first dataset, one or more references to a first set of graphics associated with a first user account to the purchase transaction user interface,
wherein, in response to providing the one or more references, the purchase transaction user interface is caused to display the first set of graphics associated with the first user account.

7. The method of claim 5, wherein the first dataset is selected for presentation modification of the purchase transaction user interface over the one or more other datasets based on a determination that at least one of the one or more other datasets is associated with a user account that corresponds to a non-compatible payment type not compatible with a transaction processing system for the purchase transaction user interface.

8. The method of claim 5, wherein the first dataset is selected for presentation modification of the purchase transaction user interface over the one or more other datasets based on a determination that at least one of the one or more other datasets is associated with a user account that do not correspond to a payment type accepted by a transaction processing system for the purchase transaction user interface.

9. The method of claim 5, further comprising:
receiving an authentication token via a transaction card associated with an account of the plurality of user accounts; and
in response to verification of the authentication token as being a valid token, providing the query to an authentication system to obtain the plurality of datasets associated with the plurality of user accounts.

10. The method of claim 5, further comprising:
providing the query to an authentication system to obtain the first dataset,
wherein, in response to providing the query, the authentication system is caused to determine whether the user authorizes sending of the first dataset.

11. The method of claim 5, further comprising:
receiving access data associated with a user device of the user;
performing, based on the access data, suspicious activity detection associated with the user identifier; and
in response to the suspicious activity detection indicating no suspicious activity, providing the query to an authentication system to obtain the plurality of datasets associated with the plurality of user accounts.

12. The method of claim 11, wherein performing the suspicious activity detection comprises:
extracting, from the access data, device identification data associated with the user device and an access time associated with the user device's access of the purchase transaction user interface;
determining, based on the device identification data and the access time, usage data related to use of the device identification data or the user identifier for obtaining one or more datasets of the plurality of datasets; and
in response to the usage data satisfying a set of validation criteria, providing the query to the authentication system to obtain the plurality of datasets.

13. The method of claim 12, wherein the device identification data comprises an IP address associated with the user device, a hardware identifier associated with the user device, a browser ID associated with the user device, or a derived identifier derived from hashing the IP address, the hardware identifier, or the browser ID.

14. A non-transitory computer-readable media comprising instructions that, when executed by one or more processors, cause operations comprising:
receiving, via a purchase transaction user interface associated with a third party, a user identifier of a user and a category associated with the third party;
generating a query for one or more user accounts associated with the user identifier;
receiving, based on the query, a plurality of datasets associated with a plurality of user accounts, each of the plurality of datasets being distinct from one or more other datasets of the plurality of datasets;
selecting, based on the category associated with the third party, a first dataset from the plurality of datasets for presentation modification of the purchase transaction user interface; and
causing modification of a presentation of the purchase transaction user interface based on one or more data items of the selected first dataset such that payment information of the selected first dataset is displayed on the purchase transaction user interface.

15. The media of claim 14, wherein causing modification of the presentation of the purchase transaction user interface comprises:
providing, as at least one data item of the selected first dataset, one or more references to a first set of graphics associated with a first user account to the purchase transaction user interface,
wherein, in response to providing the one or more references, the purchase transaction user interface is caused to display the first set of graphics associated with the first user account.

16. The media of claim 14, wherein the first dataset is selected for presentation modification of the purchase transaction user interface over the one or more other datasets based on a determination that at least one of the one or more other datasets is associated with a user account that corresponds to a non-compatible payment type not compatible with a transaction processing system for the purchase transaction user interface.

17. The media of claim 14, wherein the first dataset is selected for presentation modification of the purchase transaction user interface over the one or more other datasets based on a determination that at least one of the one or more other datasets is associated with a user account that do not correspond to a payment type accepted by a transaction processing system for the purchase transaction user interface.

18. The media of claim 14, wherein the first dataset is selected for presentation modification of the purchase transaction user interface over the one or more other datasets based on a determination that the first dataset comprises a first value for the category is greater than or equal to a second value of at least one of the one or more other datasets for the category.

19. The media of claim 14, the operations further comprising:

receiving a token via a transaction card associated with an account of the plurality of accounts; and in response to verification of the token as being a valid token, providing the query to an authentication system to obtain the plurality of datasets associated with the plurality of accounts.

20. The media of claim 14, the operations further comprising:

providing the query to an authentication system to obtain the first dataset, wherein, in response to providing the query, the authentication system is caused to determine whether the user authorizes sending of the first dataset.

* * * * *